US005751472A

United States Patent [19]

Jeys et al.

[11] Patent Number: 5,751,472
[45] Date of Patent: May 12, 1998

[54] MULTI-PASS OPTICAL PARAMETRIC GENERATOR

[75] Inventors: Thomas H. Jeys, Lexington; Tso Yee Fan, Cambridge, both of Mass.

[73] Assignee: Massachusetts Institute of Technology, Cambridge, Mass.

[21] Appl. No.: 598,662

[22] Filed: Feb. 8, 1996

[51] Int. Cl.$^6$ .................................................. G02F 1/39
[52] U.S. Cl. ............................................. 359/330; 359/326
[58] Field of Search ................................. 359/326–332

[56] References Cited

U.S. PATENT DOCUMENTS

| 3,824,717 | 7/1974 | Evtuhov et al. | 359/330 |
| 5,206,868 | 4/1993 | Deacon | 359/330 X |
| 5,483,374 | 1/1996 | Tanuma | 359/328 |
| 5,500,865 | 3/1996 | Chakmakjian et al. | 359/328 X |

OTHER PUBLICATIONS

G. P. Banfi et al., "Tunable Femtosecond Pulses Close to the Transform Limit from Traveling–Wave Parametric Conversion" *Optics Letters* 18(18):1547–1549 (1993) [No Month].

R.A. Baumgartner et al., "Optical Parametric Amplification" *IEEE J. Quant. Electr.* 15:432 (1979) (Jun.).

I.M. Bayanov et al., "Intense Subpicosecond Pulses Tunable Between 4 μm and 20 μm Generated by an All–Solid–State Laser System" *Optics Communications* 113:99–104 (1994) (Dec.).

J. M. Breteau et al., "Numerical Simulation and Realization of a KTP Optical Parametric Oscillator" *OSA Proceedings on Advanced Solid–State Lasers* 15:137 (1993) [No Month].

R. Danielius et al., "Widely Tunable β–BaB$_2$O$_4$ Parametric Laser Pumped by Femtosecond Ti: Sapphire Laser–Amplifier System" *Lithuanian Physics Journal* 33(5–6):245–248 (1993) [No Month].

T. H. Jeys, "Multipass Optical Parametric Amplifier", Solid State Research Report, Lincoln Laboratory, Lexington, MA (Jan. 1996), 8 pp.

T. H. Jeys, Memorandum to A. Sanchez et al., Massachusetts Institute of Technology, Lincoln Laboratory, Sep. 1994, 12 pp.

K. Kato, "High–Efficiency Second–Harmonic Generation at 4250–4680 Å in KNbO3" *IEEE J. Quantum Electron.* 15:410 (1979) (Jun.).

K. Kato, "Parametric Oscillation at 3.2 μm in KTP Pumped at 1.064 μm" *IEEE J. Quant. Electr.* 27:1137 (1991) (May).

L. R. Marshall et al., "Diode–Pumped Eye–Safe Laser Source Exceeding 1% Efficiency" *Opt. Lett.* 16(21):1680 (1991) (Nov.).

L. R. Marshall et al., "All–Solid State Diode–Pumped Eyesafe Lasers" *SPIE* 1627:262 (1992) [No Month].

T.E. Olson et al., "Multipass Diode–Pumped Nd:YAG Optical Amplifiers at 1.06 μm and 1.32 μm" *IEEE Photonics Technology Letters* 6(5):605–608 (1994) (May).

W. M. Theis et al., "High Resolution Infrared Measurements of the OH–Bands in KTiOPO$^4$" *Appl. Phys. Lett.* 46(11):1033 (1985) (Jun.).

J.J. Zayhowski et al., "Diode–Pumped Passively Q–Switched Picosecond Microchip Lasers" *Opt. Lett.* 19:1429 (1994) (Sep.).

*Primary Examiner*—John D. Lee
*Attorney, Agent, or Firm*—Testa, Hurwitz & Thibeault, LLP

[57] ABSTRACT

A parametric generator for efficiently converting short duration pump pulses of a first frequency to a signal beam of a desired frequency is described. The parametric generator includes a second order nonlinear parametric medium, a retro-reflector, and an optical re-imaging system. Each optical sub-path through the parametric medium is substantially distinct and non-overlapping. At least two optical sub-paths have a direction within a phase matching acceptance angle of the parametric material which corresponds to the desired wavelength. The parametric generator can be configured to be compact because it utilizes multiple transmissions through the parametric medium and it employs only a single pump beam input.

24 Claims, 5 Drawing Sheets

MULTI-PASS OPTICAL PARAMETRIC GENERATOR

This invention was made with government support under contract Number F19628-95-C-0002 awarded by the Air Force. The government has certain rights in the invention.

FIELD OF THE INVENTION

The invention relates generally to the field of nonlinear optics and, in particular, to the parametric generation of optical radiation at a desired frequency.

Background of the Invention

Techniques for optical parametric generation can be generally classified according to the temporal characteristics of the pump radiation. Optical parametric oscillators have been favored for cw or pulsed (>1 ns) pump radiation. For shorter-duration pump pulses (<1 ns), the pump intensity required to make the signal buildup time less than the pump-pulse duration often exceeds the damage threshold of the nonlinear media. Either synchronously pumped optical parametric oscillators or optical parametric amplifiers (OPA) have been favored for very short pulse durations (<100 ps). For longer-duration (>100 ps) OPA pump pulses, the pump energy density required for efficient conversion often exceeds the parametric medium damage threshold.

Currently, there exists a need for an optical parametric generator that efficiently generates radiation in 100 ps to 1 ns range. It is therefore a principal object of this invention to efficiently generate radiation in 100 ps to 1 ns range by utilizing a multi-pass parametric amplifier or oscillator without damaging the nonlinear medium.

SUMMARY OF THE INVENTION

The invention relates to a method and an apparatus for efficient generation of parametric optical radiation of a desired frequency. The method and apparatus utilize multiple transmissions of a first beam of radiation, which is typically called a pump beam, through one or more second order nonlinear parametric media. A second beam, which is typically called a signal beam and is either input into the parametric media or is generated from noise, is amplified by the parametric process. The sum of the frequencies of the signal and idler beams equals the frequency of the pump beam. A third beam, which is typically called an idler beam, is generated in the parametric process. The desired beam can be either the signal or the idler beam. Likewise the undesired beam may be either the idler beam or the signal beam. The undesired beam may be re-phased in order to match the phase of the beat beam formed from the pump beam and the desired beam. Alternatively, the undesired beam may be removed after each transmission. The apparatus for efficient conversion of pump radiation may be miniaturized and easily adapted for laser ranging and radar applications which require short pulses.

Accordingly, the present invention features a method and apparatus for generating parametric optical radiation of a desired frequency. The method includes providing a second-order parametric medium having an input to couple in radiation of a first frequency. The method also includes transmitting the radiation of the first frequency along an optical path comprising a plurality of sub-paths through the parametric medium. Each of the optical sub-paths are substantially distinct and non-overlapping. In addition, at least two optical sub-paths have a direction within a phase matching acceptance angle or a quasi-phase matching acceptance angle of the parametric medium which corresponds to the desired frequency.

The method and apparatus for generating parametric optical radiation of a desired frequency may also include re-imaging the radiation in order to maintain the beam parameters throughout the optical path. The radiation may be re-imaged after every optical sub-path or after a number of optical sub-paths. The re-imaging may be along an input path of the pump radiation.

The method and apparatus for generating parametric optical radiation of a desired frequency may also include re-phasing the radiation after every optical sub-path or after a number of optical sub-paths. Alternatively, the method for generating parametric optical radiation of a desired frequency may include removing undesirable radiation after every optical sub-path or after a number of optical sub-paths.

In another embodiment, the present invention features a multi-pass optical parametric generator. The parametric generator can be either a parametric amplifier or a parametric oscillator. The parametric generator includes a second order nonlinear parametric medium having an optical path through a first and a second end. The optical path is within a phase matching acceptance angle of the parametric medium. The parametric generator also includes an input for coupling radiation of a first frequency into the parametric medium and an output for transmitting a desired radiation of a second frequency out of the parametric medium.

In addition, the parametric generator also includes a first and a second retro-reflector positioned in the optical path and adjacent to the first and the second ends of the parametric medium, respectively. In one embodiment, the retro-reflector is a roof prism positioned in the optical path of the parametric medium. In another embodiment the retro-reflector is a re-imaging optical system positioned in the optical path of the parametric medium. The re-imaging system may be a substantially achromatic lens and a mirror. The re-imaging system may also be a concave mirror and a substantially flat mirror.

The parametric generator may also include an element for removing undesirable radiation out of the optical path. In one embodiment, an absorbing medium is positioned in the optical path for absorbing undesirable radiation. In another embodiment, a reflector is positioned in the optical path for removing undesirable radiation out of the optical path. In another embodiment, a transmission element is positioned in the optical path for transmitting undesirable radiation out of the optical path. In another embodiment, a polarizer is positioned in the optical path for removing undesirable radiation.

In another embodiment, the present invention features an optical parametric generator having a plurality of second order nonlinear parametric media positioned in an optical path. The optical parametric generator includes an input for coupling radiation of a first frequency into the optical path of the plurality of parametric media and an output for transmitting a desired radiation of a second frequency out of the optical path.

The optical parametric generator also includes undesirable radiation removal elements positioned between each of the plurality of parametric media. The radiation removal elements may be mirrors positioned in the optical path which reflect the undesirable radiation out of the optical path. The radiation removal elements may also be absorbing media positioned in the optical path which absorbs the undesirable radiation out of the optical path. The radiation removal elements may also be a polarizer positioned in the optical path for removing undesirable radiation.

In another embodiment, the present invention features a range finder which utilizes a multi-pass optical parametric generator. The range finder includes a source of radiation of a first frequency. The range finder also includes a second order nonlinear parametric medium having an optical path through a first and a second end. The range finder has an input positioned to receive radiation of the first frequency from the source and positioned to couple the radiation into the parametric medium. The range finder also has a retro-reflector positioned adjacent the first end of the parametric medium and positioned within the optical path. The range finder also has a retro-reflector positioned adjacent the second end of the parametric medium and positioned within the optical path.

In addition, the range finder has an output positioned to transmit desired radiation having a second frequency out of the parametric medium and to a target. The desired second frequency may be substantially in an eyesafe region. A detector is positioned to receive the desired radiation of the second frequency after the radiation of the second frequency is reflected from the target. A processor, which is responsive to the output of the detector, determines the range of the target in response to the detection of the desired radiation reflected from the target.

A discovery of the present invention is that efficient parametric generation of a desired radiation can be achieved with a multi-pass parametric generator which utilizes radiation transmitting through a second order nonlinear parametric medium which has a plurality of sub-paths with certain characteristics. Specifically, efficient parametric conversion can be achieved where each sub-path is substantially distinct and non-overlapping and has a direction within a phase matching acceptance angle or quasi-phase matching acceptance angle of the parametric medium which corresponds to a desired frequency. Such a parametric generator has a threshold intensity that is independent of the pump-pulse duration (assuming no group velocity dispersion).

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Figure 1:
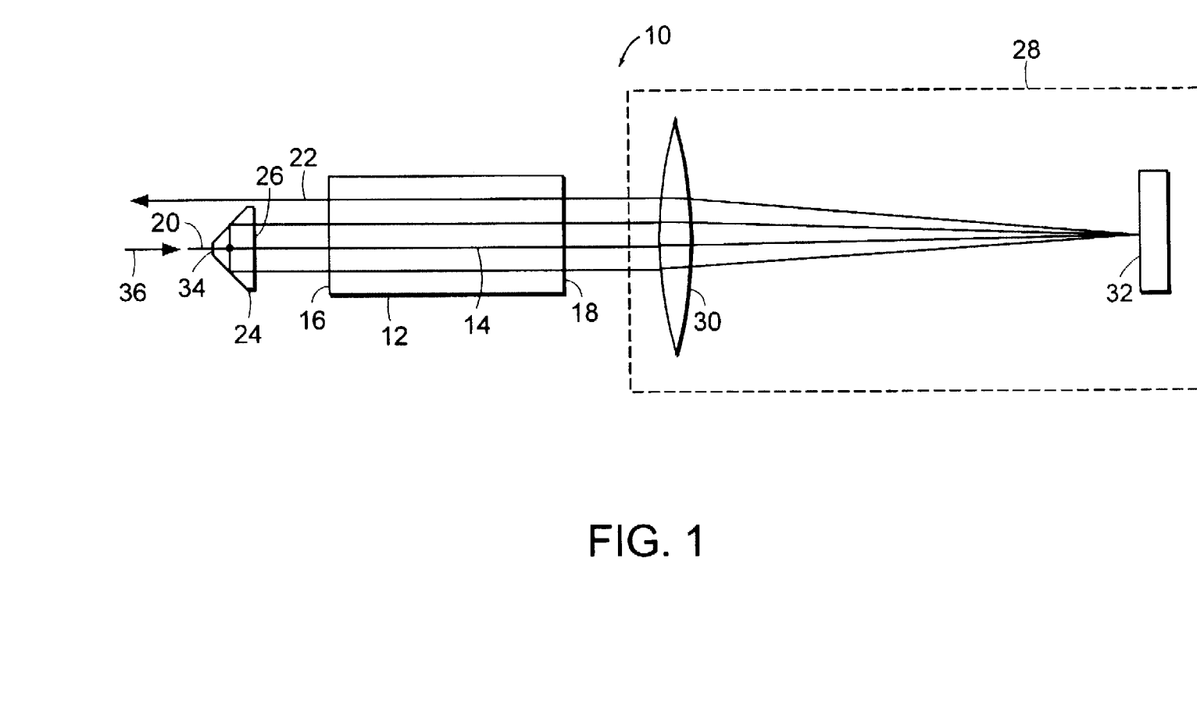
FIG. 1 is a highly schematic diagram of an embodiment of a multi-pass optical parametric generator which allows efficient conversion of pump radiation to radiation of a desired frequency.

FIG. 1 is a schematic diagram of an embodiment of a multi-pass optical parametric generator which allows efficient conversion of pump radiation to radiation of a desired frequency. The parametric generator 10 includes a second order nonlinear parametric medium 12 having an optical path 14 through a first 16 and a second end 18. Various crystals and polymers may be used for the parametric medium 12. For example, $KTiOPO_4$ (KTP), which has high non-linearity and a large temperature acceptance, may be used. The optical path 14 is within a phase matching acceptance angle (not shown) of the parametric medium 12 which is the angle where the phase velocity of the beat beam formed from the pump beam and the desired beam matches the phase velocity of the undesired beam. FIG. 1 illustrates an optical path comprising four passes through the nonlinear crystal which define four optical sub-paths. Howeverany number of sub-paths greater than one and more than one pass per sub-path are possible.

The parametric generator 10 also includes an input 20 for coupling radiation of a first frequency into the parametric medium 12 and an output 22 for transmitting a desired radiation of a second frequency out of the parametric medium 12. The radiation of the first frequency may be generated by a laser such as an amplified, passively Q-switched, Nd:YAG laser. In addition, the parametric generator 10 includes a roof-prism 24 adjacent the first end 16 and positioned within the optical path 14 of the parametric medium 12. Typically, a base 26 of the roof prism 24 is antireflection coated at the pump beam and signal beam wavelengths. The roof-prism 24 may be formed of BK7 glass. Other retro-reflectors can be used in place of the roof-prism 24. Alternatively, the first end 16 of the parametric medium 12 may be formed into a roof prism 24 so that the parametric medium 12 and the prism 24 is unitary.

The parametric generator 10 also includes a re-imaging optical system 28 adjacent the second end 18 and positioned within the optical path 14 of the parametric medium 12. The re-imaging system 28 may be a substantially achromatic lens 30 and a plane mirror 32. By substantially achromatic we mean that the lens 30 must be achromatic enough so that the pump and desired beams overlap throughout the multiple passes. The achromatic lens 30 may be positioned approximately one focal length from a polished edge 34 of the roof prism 24. The plane mirror 32 may be positioned approximately one focal length from the achromatic lens 30. The plane mirror 32 and the achromatic lens 30 is another form of a retro-reflector.

The achromatic lens 30 may be a singlet, plano convex lens formed of calcium fluoride. Typically, the surfaces of the achromatic lens 30 are antireflection coated at the pump and desired beam wavelengths. Typically, the plane mirror 32 is high reflection coated at the pump and desired beam wavelengths.

The multi-pass optical parametric generator of FIG. 1 amplifies a weak signal beam with a strong pump beam 36. The weak signal may be transmitted into the parametric medium 12 from an external source (not shown) or may be generated within the parametric medium from noise. After the pump and signal beams enter the parametric medium 12, the pump beam is parametrically converted to the signal beam and an idler beam. For sufficiently high pump intensity, the gain of the parametric generator can be sufficient to amplify the background quantum fluctuations at the signal wavelength so that a substantial signal beam can be generated with only an input pump beam and no intentional input signal beam.

The wavelengths of the signal and idler beams depend on the relative orientation of the parametric medium 12 and the pump beam propagation direction. The wavelengths also depend on the pump and signal beam polarization directions. Because the parametric process conserves energy, the sum of the signal and idler beam photon energies is equal to the pump beam photon energy.

In operation, an input pump beam 36 enters the polished edge 34 of the roof prism 24 and travels through a sub-path in the parametric medium 12 where parametric conversion amplifies a signal beam (not shown) and creates an idler beam (not shown). For example, an input pump beam of 1064 nm propagating through a X-cut KTP parametric medium will efficiently amplify a 1572 nm signal beam and will create a 3293 nm idler beam. For the purposes of this discussion it will be assumed that the signal beam is the desired beam and the idler beam is the undesired beam. However, it should be understood that conversely, the signal beam could be the undesired beam and the idler be could be the desired beam, without any loss of generality.

A resulting beam comprising the pump, signal and idler beams emerges from the parametric medium 12 and then travels through the achromatic lens 30 and is reflected by the plane mirror 32. Before the idler beam re-enters the parametric medium 12, it is either removed from the optical path 14 or re-phased so that phase velocity of the beat pump and signal beam is matched to the phase velocity of the idler beam. Phase matching the beat pump and signal beam allows constructive interference. Removing the idler beam from the optical path will result in a slight increase in the threshold pump power for efficient parametric conversion, but will simplify the design and construction of the multi-pass optical parametric generator.

The idler beam can be removed in numerous ways. The idler beam can be removed by positioning absorbing media (not shown) in the optical path between the first end 16 of the parametric medium 12 and the roof prism 24 and between the second end 18 of the parametric medium 12 and the plane mirror 32. The absorbing media may be a separate optical element or may be an absorbing film deposited on the roof prism 24 and the achromatic lens 30 or the plane mirror 32. The absorbing medium may also be the prism 24 and lens 30 or mirror 32 optical material itself. For example, a roof prism formed of BK7 glass will absorb a 3293 nm idler beam. The absorbing material may even be the parametric material itself. For example, KTP has an absorption coefficient of approximately 0.5 cm$^{-1}$ at 3200 nm and thus will absorb a substantial fraction of a 3293 nm idler beam. The idler beam can also be removed by antireflection coating the mirror 32 at the idler beam wavelength.

The idler beam can also be reflected by a reflector (not shown) positioned in the optical path between the parametric medium 12 and the plane mirror 32 which reflects the idler beam, but transmits the pump and signal beams. The idler beam can also be removed using a polarizer provided that the polarization of the undesirable radiation is orthogonal to the pump and desirable beams. Re-phasing may be accomplished with phase adjustment plates positioned in the optical path. Re-phasing may also be accomplished by positioning angularly adjustable dispersive windows in the optical path.

The resulting beam then travels back through a sub-path in the parametric medium 12 along an anti-parallel and offset path to the first pass through the parametric medium 12. If the idler beam was removed before re-entering the parametric medium 12, a new idler beam will be generated which is in phase with the beat pump and signal beam. The resulting beam is then offset and reflected by the roof prism 24. Re-focusing typically occurs at a point along the input pump beam 36. The resulting beam then travels along a parallel and offset path to the first pass through the parametric medium 12.

The resulting radiation thus travels on an expanding spiral path which makes multiple sub-path transmissions through the parametric medium 12 and, eventually, misses the roof prism 24 and becomes the output beam 22. The re-imaging system 28 and the retro-reflector roof prism 24 maintain the beam parameters over the entire optical path and thus achieves a low threshold pump intensity.

The number of sub-paths through the parametric medium 12 is controlled by angular adjustment of the plane mirror 32 or by transverse translation of the achromatic lens 30. Note that each sub-path is substantially distinct and non-overlapping. There may, however, be some co-propagation of the outer diameter of the beams. In addition, at least two optical sub-paths have a direction within a phase matching acceptance angle of the parametric medium which corresponds to the desired frequency.

The multi-pass optical parametric generator of FIG. 1 employing a X-cut KTP crystal parametric medium has been utilized to efficiently generate a 1064 nm pump beam with a 360 ps pump-pulse duration to a 1572 nm signal beam. For example, an eight-pass parametric generator with an input pump beam energy of 150μJ and an input beam diameter of 200 μm converted more than 30% of the input pump beam energy into output signal energy. The pump depletion was approximately 80% The pump threshold for efficient generation was approximately 52 μJ The multi-pass optical parametric generator of FIG. 1 is advantageous because it can perform efficient parametric conversion of low energy pump radiation. For example, eye-safe 1.57 micron radiation can by efficiently converted from inexpensive and readily available 1.06 micron Nd:YAG laser radiation for high resolution ranging and radar applications. In addition, the multi-pass optical parametric generator of FIG. 1 is advantageous because it may be configured to be compact. The single input greatly simplifies design and construction of the multi-pass parametric generator.

Figure 2:
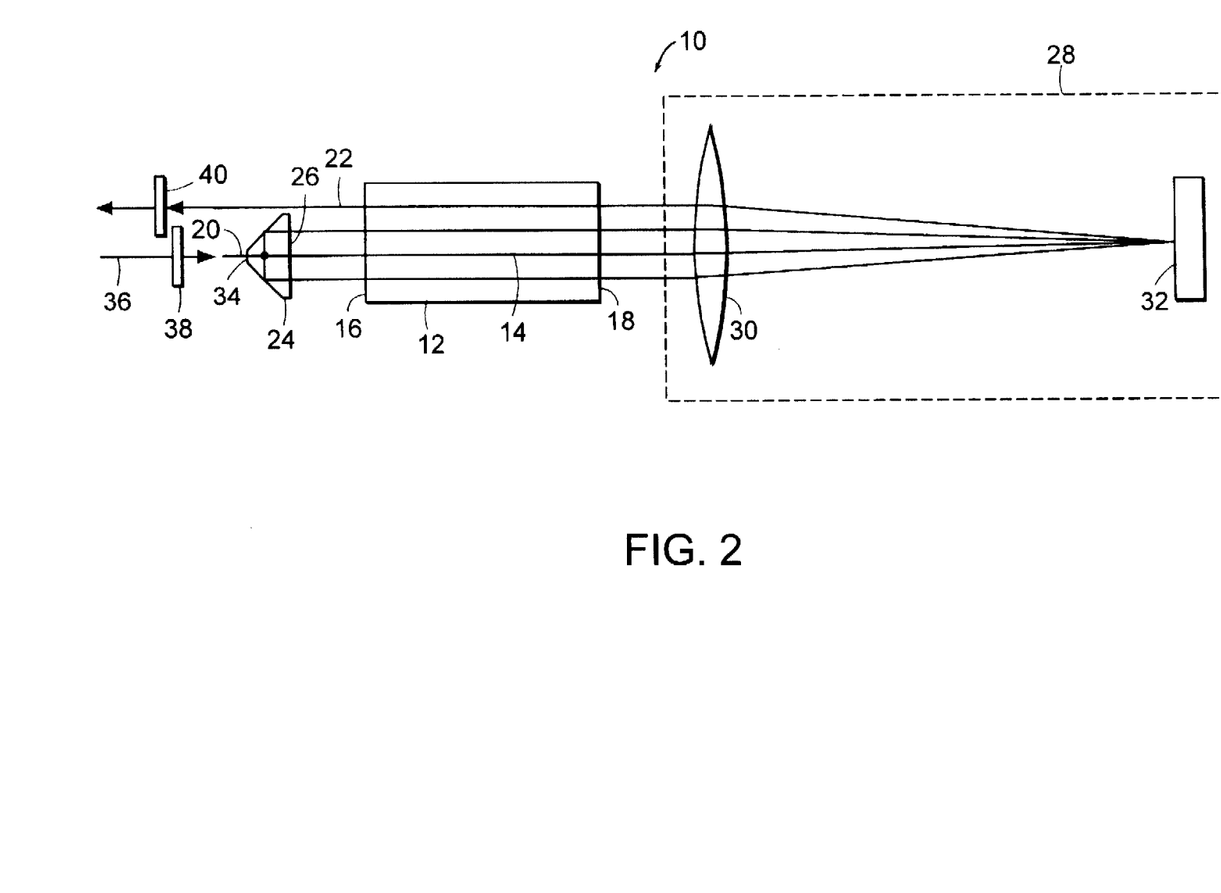
FIG. 2 is a highly schematic diagram of an embodiment of a multi-pass optical parametric oscillator which allows efficient conversion of pump radiation to radiation of a desired frequency.

FIG. 2 is a highly schematic diagram of an embodiment of a multi-pass optical parametric oscillator which allows efficient conversion of pump radiation to radiation of a desired frequency. FIG. 2 is identical to the parametric generator illustrated in FIG. 1 except for the addition of a first 38 and a second feedback mirror 40. The first feedback mirror 38 transmits the pump beam 36 and reflects the desired beam back to the polished edge 34 of the roof prism 24. The second feedback mirror partially transmits the desired output beam 22 and partially reflects the desired output beam 22 back into the parametric medium 12.

Figure 3A:
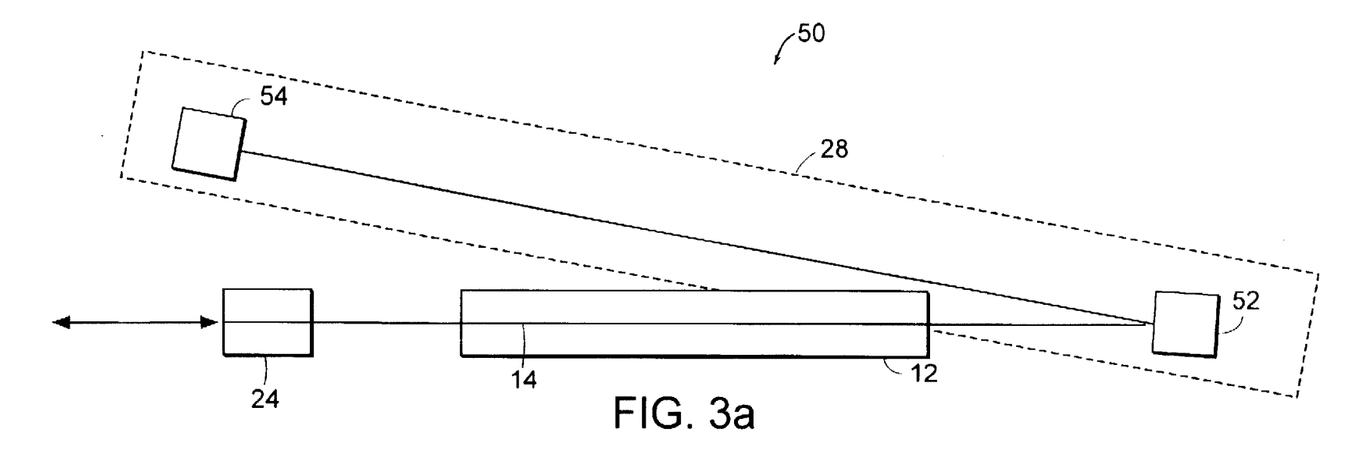
FIG. 3a–b is a side and top view, respectively, of a highly schematic diagram of an embodiment of a multi-pass optical parametric generator where the re-imaging system utilizes a concave mirror and a substantially flat mirror positioned in the optical path of the second order nonlinear parametric medium.
Figure 3B:
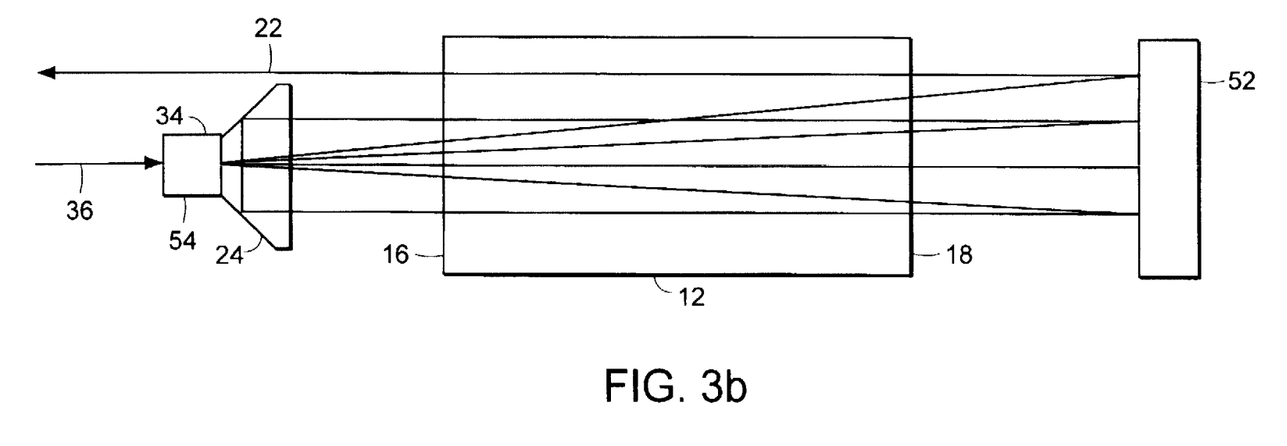

FIG. 3a–b is a highly schematic diagram of an embodiment of a multi-pass optical parametric generator where the re-imaging system utilizes a concave mirror and a substantially flat mirror. FIG. 3a is a side view of the parametric amplifier. The parametric amplifier 50 includes a second order nonlinear parametric medium 12, a roof prism 26 or other retro-reflector, and a re-imaging system 28. The re-imaging system 28 includes a concave mirror 52 and a substantially flat mirror 54 both positioned in the optical path 14 of the parametric medium 12. FIG. 3b is a top view of the parametric generator 50 which illustrates four sub-paths through the parametric material 12.

In operation, an input pump beam 36 enters a polished edge 34 of the roof prism 24 and travels through a sub-path in the parametric medium 12 where parametric conversion amplifies a signal beam of the desired frequency (not shown) and creates an idler beam (not shown). A resulting beam comprising the pump, signal and idler beams emerges from the parametric medium and then travels to the concave mirror 52 where it is reflected to the flat mirror 54. The resulting beam is then reflected back to the concave mirror 52 here it is reflected back to the parametric medium 12.

Before the idler beam re-enters the parametric medium 12 it is either removed from the resulting beam or re-phased so that phase velocity of the beat pump and signal beam is matched to the phase velocity of the idler beam. Removing the idler beam will result in a slight increase in the threshold pump power for efficient parametric conversion, but will simplify the design and construction of the parametric generator 12. The idler beam can be removed or re-phased in the numerous ways as described in connection with FIG. 1.

The resulting beam then travels back through the parametric medium 12 along an anti-parallel and offset sub-path to the first pass through the parametric medium 12. If the idler was removed before re-entering the parametric medium 12, a new idler beam will be generated which is in phase with the beat pump and signal beam. The resulting beam is then offset and reflected by the roof prism 24. Re-focusing typically occurs at a point that is along the input pump beam 36. The resulting beam then travels along a parallel and offset path to the first pass through the parametric medium 12. The resulting radiation thus travels on an expanding spiral path which makes multiple sub-path transmissions through the parametric medium 12 and, eventually, misses the flat mirror 54 and becomes an output beam 22. The re-imaging system 28 and the retro-reflector roof prism 24 maintain the beam parameters over the entire optical path.

The number of sub-paths through the parametric medium 12 can be controlled by angular adjustment of the flat mirror 54. Note that each sub-path is substantially distinct and non-overlapping. There may, however, be some co-propagation of the outer diameter of the beams. In addition, at least two optical sub-paths have a direction within a phase matching acceptance angle of the parametric medium corresponding to the desired frequency.

The energy of the pump beams in FIGS. 1–32 is, however, limited because the size of the pump beams is limited. Currently, the practical dimensions of parametric media is relatively small and the optical damage thresholds are relatively low. For a given number of passes through the parametric medium, the size of the pump beam is, therefore, limited. Thus, for high energy, short pulse, pump beams, utilizing a plurality of parametric media is desirable.

Figure 4:
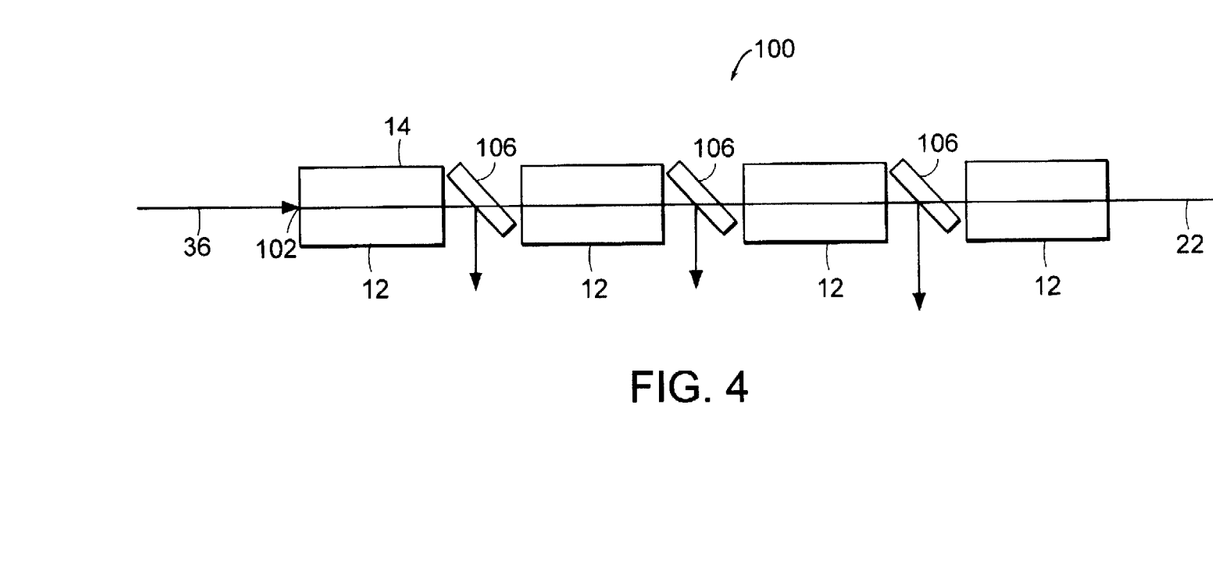
FIG. 4 is an embodiment of a optical parametric generator which utilizes a plurality of second order nonlinear parametric media positioned in the optical path and a plurality of undesirable radiation removal elements positioned between each of the parametric media.

FIG. 4 is a highly schematic diagram of an embodiment of an optical parametric generator which utilizes a plurality of second order nonlinear parametric media positioned in the optical path and a plurality of undesirable radiation removal elements positioned between each of the parametric media. The parametric generator 100 includes an input 102 for coupling a pump beam 36 of a first frequency into an optical path 14 of a plurality of parametric media 12 and an output 104 for coupling a signal beam out of the optical path 14. The radiation removal elements 106 may be mirrors positioned between each of the plurality of parametric media 12 which reflect the undesirable radiation out of the optical path 14. The radiation removal elements 106 may also be absorbing media positioned in the optical path 14 which absorb the undesirable radiation out of the optical path 14 but which allow the signal and pump radiation to transmit. The radiation removal elements 106 may also be polarizer for removing undesirable radiation out of the optical path 14.

The geometry of FIG. 4 has numerous advantages. Re-imaging of the radiation between parametric media 12 is not necessary if the confocal parameter of the pump beam is larger than the effective length of the parametric media 12. Also, because the idler radiation is removed between each parametric medium 12, re-phasing is not required and the angular and temperature phase matching acceptance are determined by the length of each individual parametric medium.

Figure 5:
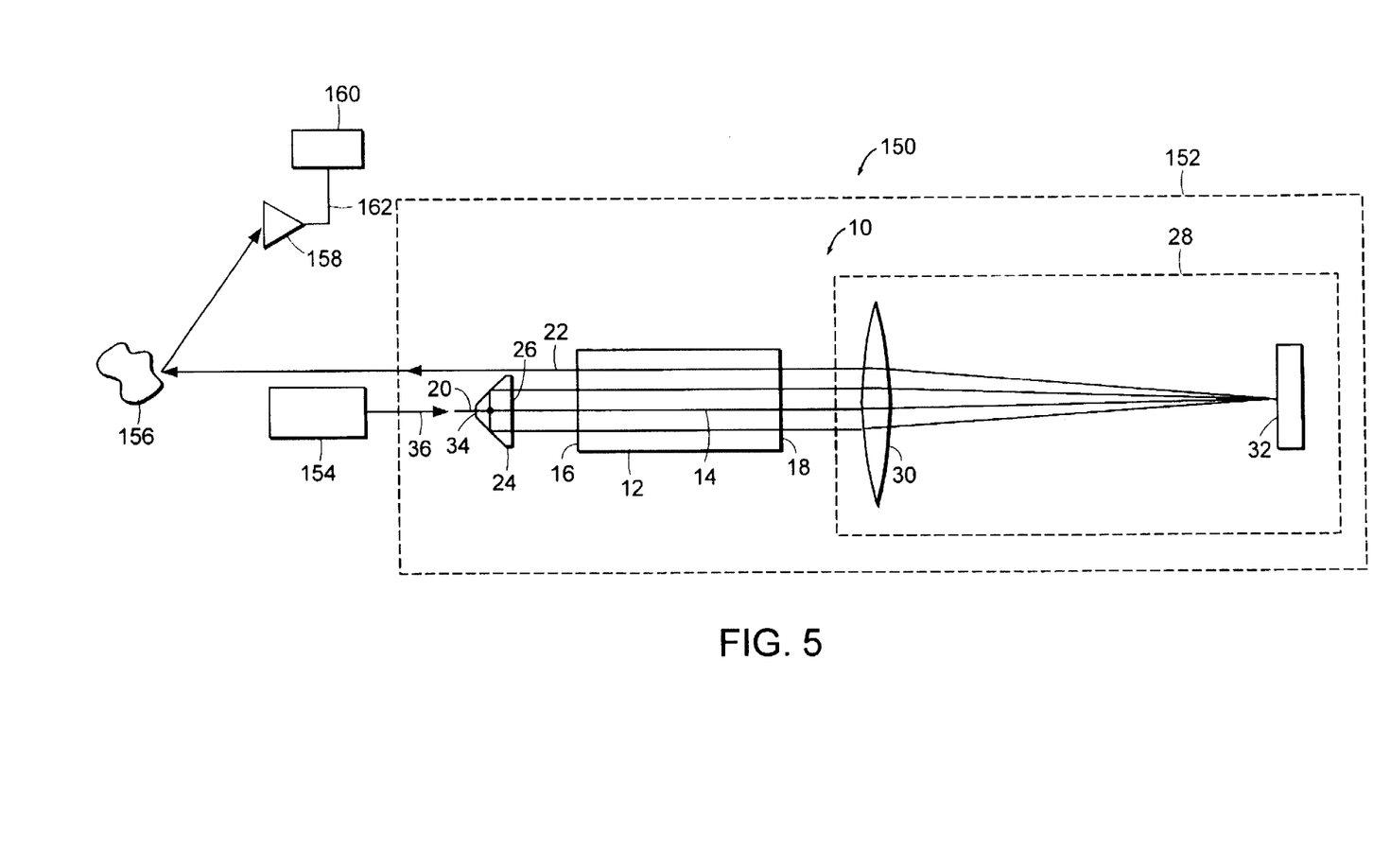
FIG. 5 is a block diagram of a high resolution range finder which utilizes a multi-pass parametric generator.

FIG. 5 is a block diagram of a high resolution range finder 150 which utilizes a multi-pass parametric generator 152. The range finder 150, in one embodiment, includes a source of radiation 154 having a first frequency. The range finder 150 also includes a second order nonlinear parametric medium 12 having an optical path 14 through a first 16 and a second end 18. The range finder 150 has an input 34 positioned to receive radiation of the first frequency from the source 154 and positioned to couple the radiation into the parametric medium 12. The range finder 150 also has a retro-reflector 26 positioned adjacent the first end 16 and positioned within the optical path 14 of the parametric medium 12. The range finder 150 also has a re-imaging optical system 28 positioned adjacent the second end 18 and positioned within the optical path 14 of the parametric medium 12.

In addition, the range finder 150 has an output beam 22 positioned to transmit a desired radiation of a second frequency out of the parametric medium 12 and to a target 156. The second frequency may be substantially in an eyesafe region. A detector 158 is positioned to receive the desired radiation of the second frequency after the radiation of the second frequency is reflected from the target 156. A processor 160, which is connected to the output of the detector 162, determines the range of the target 156 in response to the detection of the desired radiation reflected from the target 156.

In operation, the laser 154 transmits a pump beam 36 into the multi-pass parametric generator 152 where the signal output beam 22 is generated. The parametric generator 152 is positioned such that the output beam 22 irradiates the target 156. The output beam 22 is reflected off of the target 156 and into the detector 158. The processor 160 reads the output 162 of the detector 158 and determines the range of the target 156.

Equivalents

While the invention has been particularly shown and described with reference to specific preferred embodiments, it should be understood by those skilled in the art that various changes in form and detail may be made therein without departing from the spirit and scope of the invention as defined by the appended claims.

We is claimed is:

1. A method for generating parametric optical radiation of a desired frequency, comprising:
   a) providing a second order nonlinear parametric medium;
   b) transmitting radiation of a first frequency along an optical path comprising a plurality of sub-paths through the parametric medium, each of the sub-paths being substantially distinct and non-overlapping, at least two optical sub-paths having a direction within a phase matching acceptance angle of the parametric medium corresponding to the desired frequency; and c) removing undesirable radiation from the optical path.

2. The method of claim 1 further comprising the step of re-imaging the radiation.

3. The method of claim 2 wherein the re-imaging is along an input path.

4. The method of claim 1 further comprising the step of re-imaging the radiation after every other optical sub-path.

5. The method of claim 1 further comprising the step of re-phasing the radiation.

6. The method of claim 1 further comprising the step of re-phasing the radiation after substantially every optical sub-path.

7. The method of claim 1 further comprising the step of removing undesirable radiation after substantially every optical sub-path.

8. A method for parametric down-conversion comprising:
a) providing a second order nonlinear parametric medium; and
b) transmitting radiation of a first frequency along an optical path comprising a plurality of sub-paths through the parametric medium, each of the subpaths being substantially distinct and non-overlapping, at least two optical sub-paths having a direction within a phase matching acceptance angle of the parametric medium corresponding to a desired frequency, the desired frequency being lower than the first frequency.

9. A multi-pass optical parametric generator, comprising:
a) a second order nonlinear parametric medium defining a plurality of optical paths through a first and a second end each of the optical paths being substantially distinct and non-overlapping;
b) a first retro-reflector adjacent the first end and positioned within the optical paths of the parametric medium;
c) a second retro-reflector adjacent the second end and positioned within the optical paths of the parametric medium;
d) an input for coupling radiation of a first frequency into the parametric medium;
e) an undesirable radiation removal element for removing undesirable radiation from the optical paths; and
f) an output for transmitting a desired radiation of a second frequency out of the parametric medium.

10. The apparatus of claim 9 wherein the second retro-reflector is a re-imaging optical system.

11. The apparatus of claim 10 wherein the re-imaging system comprises a substantially achromatic lens and a mirror both positioned in the optical path of the parametric medium.

12. The apparatus of claim 10 wherein the re-imaging system comprises a concave mirror and a substantially flat mirror positioned in the optical path of the parametric medium.

13. The apparatus of claim 9 wherein the optical path through the first and second ends of the parametric medium is within a phase matching acceptance angle of the parametric medium.

14. The apparatus of claim 9 further comprising an absorbing medium positioned in the optical path for absorbing undesirable radiation.

15. The apparatus of claim 9 further comprising a reflector positioned in the optical path for removing undesirable radiation out of the optical path.

16. The apparatus of claim 9 further comprising a transmission element positioned in the optical path for transmitting undesirable radiation out of the optical path.

17. The apparatus of claim 9 further comprising a polarizer positioned in the optical path for removing undesirable radiation out of the optical path.

18. The apparatus of claim 9 wherein at least the first or the second retro-reflector is a roof prism positioned in the optical path of the parametric medium.

19. An optical parametric generator, comprising:
a) a plurality of parametric media positioned in an optical path;
b) an undesirable radiation removal element positioned between each of the plurality of parametric media;
c) an input for coupling radiation of a first frequency into the optical path of the plurality of parametric media; and
d) an output for transmitting a desired radiation of a second frequency out of the optical path of the plurality of parametric media.

20. The optical parametric generator of claim 19 wherein the radiation removal element is a mirror positioned between each of the plurality of parametric media which reflects the undesirable radiation out of the optical path.

21. The optical parametric generator of claim 19 wherein the radiation removal element is an absorbing medium positioned between each of the plurality of parametric media which absorbs the undesirable radiation out of the optical path.

22. The optical parametric generator of claim 19 wherein the radiation removal element is a polarizer positioned between each of the plurality of parametric media which removes the undesirable radiation from the optical path.

23. A range finder comprising:
a) a source of radiation of a first frequency;
b) a second order nonlinear parametric medium having an optical path through a first and a second end;
c) an input positioned to receive radiation of the first frequency from the source and to couple the radiation into the parametric medium;
d) a first retro-reflector adjacent the first end and positioned within the optical path of the parametric medium;
e) a second retro-reflector adjacent the second end and positioned within the optical path of the parametric medium;
f) an undesirable radiation removal element for removing undesirable radiation from the optical path;
g) an output positioned to transmit a desired radiation of a second frequency out of the parametric medium and to a target;
h) a detector positioned to receive the desired radiation of the second frequency after the radiation of the second frequency is reflected from the target, the detector having an output; and
i) a processor connected to the output of the detector, the processor determining the range of the target in response to the detection of the desired radiation reflected from the target.

24. The range finder of claim 23 wherein the second frequency is substantially in an eyesafe region of the spectrum.

* * * * *